(12) United States Patent
Igarashi et al.

(10) Patent No.: US 8,941,479 B2
(45) Date of Patent: Jan. 27, 2015

(54) OBSTACLE RECOGNITION SYSTEM AND METHOD FOR A VEHICLE

(75) Inventors: Shinji Igarashi, Susono (JP); Tomonori Akiyama, Susono (JP); Yuki Yoshihama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 13/825,936

(22) PCT Filed: Sep. 29, 2011

(86) PCT No.: PCT/IB2011/002267
§ 371 (c)(1),
(2), (4) Date: Mar. 25, 2013

(87) PCT Pub. No.: WO2012/042355
PCT Pub. Date: Apr. 5, 2012

(65) Prior Publication Data
US 2013/0194086 A1 Aug. 1, 2013

(30) Foreign Application Priority Data
Oct. 1, 2010 (JP) .................. 2010-224156

(51) Int. Cl.
*B60Q 9/00* (2006.01)
(52) U.S. Cl.
USPC ........................... 340/435; 340/436

(58) Field of Classification Search
USPC .......... 340/435, 436, 439, 901, 903; 382/100, 382/103, 104, 107; 701/300
See application file for complete search history.

(56) References Cited

U.S. PATENT DOCUMENTS

| | | | |
|---|---|---|---|
| 6,138,062 A | 10/2000 | Usami | |
| 6,549,124 B1 * | 4/2003 | Ishikawa et al. | 340/435 |
| 7,437,243 B2 * | 10/2008 | Fujimoto | 701/300 |
| 8,204,276 B2 * | 6/2012 | Higuchi et al. | 382/104 |
| 2007/0010945 A1 | 1/2007 | Shoda et al. | |
| 2011/0222732 A1 | 9/2011 | Higuchi et al. | |

FOREIGN PATENT DOCUMENTS

| | | |
|---|---|---|
| EP | 1 912 157 A1 | 4/2008 |
| EP | 1 334 008 B1 | 7/2008 |
| JP | A-07-065294 | 3/1995 |
| JP | A-10-31799 | 2/1998 |
| JP | A-2000-242898 | 9/2000 |
| JP | A-2007-8402 | 1/2007 |
| JP | A-2007-249463 | 9/2007 |
| JP | A-2010-72973 | 4/2010 |

* cited by examiner

*Primary Examiner* — Van T. Trieu
(74) *Attorney, Agent, or Firm* — Oliff PLC (57) ABSTRACT

An object recognition system of a vehicle includes detecting means for detecting an object that is present around the vehicle, and enlarging means for enlarging the size of the object detected by the detecting means and recognizing the enlarged object, wherein a direction of enlargement of the object is determined according to a basis other than the object. When an object that is present around the vehicle is detected, the enlarging means enlarges the size of the object in a direction parallel to an indicator indicative of a lane boundary.

14 Claims, 11 Drawing Sheets

OBSTACLE RECOGNITION SYSTEM AND METHOD FOR A VEHICLE

BACKGROUND OF THE INVENTION

1. Field of the Invention

The invention relates to an object recognition system installed on a vehicle, such as an automobile, and also relates to an object recognition method.

2. Description of Related Art

In Japanese Patent Application Publication No. 2007-8402 (JP-A-2007-8402), for example, a technology of detecting an object that lies on a course of a running vehicle as an obstacle, and informing the driver of the presence of the detected obstacle, or assisting a driving operation for circumventing or avoiding the obstacle has been proposed. In the meantime, there is room for improvement with regard to a method of recognizing a relatively small object.

SUMMARY OF THE INVENTION

The present invention provides object recognition system and object recognition method of a vehicle, which make it possible to recognize a relatively small object more effectively.

In order to provide such object recognition system and method, the invention has been developed, taking note of enlarging the size of an object that is present around the vehicle in a certain direction and recognizing the enlarged object.

An object recognition system of a vehicle according to a first aspect of the invention includes detecting means for detecting an object that is present around the vehicle, and enlarging means for enlarging the size of the object detected by the detecting means and recognizing the enlarged object, wherein a direction of enlargement of the object is determined according to a basis other than the object.

According, to the above aspect of the invention, when a small object is present around the vehicle, the size of the object is virtually enlarged. Accordingly, when the above aspect of the invention is applied to a system for determining a region (running course) on which the vehicle is able to run, according to the size and position of the detected object, a system for informing the driver of the presence of the object, or a system for assisting a driving operation for circumventing the object, the running course may be set, or conditions under which the driver is informed of the presence of the object, or conditions under which the driving operation is assisted may be determined, according to the size and position of the object thus enlarged. For example, when the position of the object slightly deviates from the course of the vehicle (i.e., a path along which the vehicle is expected to travel in the future), it is possible to prevent a situation where a course on which the vehicle would pass by the object is set, or inform the driver in advance of the possibility that the vehicle passes by the object, or assist the driving operation so as to prevent the vehicle from getting close to the object.

In the object recognition system according to the first aspect of the invention, the basis other than the object may be at least one indicator that extends continuously or comprises a plurality of elements located at intervals, and the enlarging means may enlarge and recognize the object so as to increase the parallelism between the indicator(s) and the direction of enlargement of the object detected by the detecting means.

In the object recognition system according to the first aspect of the invention, the above-indicated at least one indicator may be at least one of a road marker indicative of a lane boundary and at least one three-dimensional object that extends on the side of a road or a plurality of three-dimensional objects located at intervals on the side of the road. The "at least one indicator" mentioned herein may include three-dimensional objects, such as a curb, guardrail, gutter, wall, or a pole, which extends on the side of the road, or located at intervals on the side of the road, in addition to the road marker(s), such as a white line or a yellow line, indicative of the lane boundary.

If the size of the object is virtually enlarged in the above manner, the enlarged object is recognized as extending in a direction substantially parallel to the road or lane. As a result, when a running course is set based on the enlarged object, the parallelism between the running course and the road can be increased. Also, the operation amount or yaw rate required to prevent the vehicle from getting close to or colliding with the enlarged object can be kept small or reduced, and the operation amount or yaw rate required to cause the vehicle to return to the running course after circumventing the object can be kept small or reduced.

In the object recognition system according to the first aspect of the invention, when the detecting means detects a plurality of objects, the enlarging means may enlarge the size of one of the objects which has the shortest distance relative to the vehicle, and recognize the enlarged object. In this case, it is possible to set the running course so that the vehicle does not approach the object located at the smallest distance from the vehicle (i.e., closest to the vehicle), or inform the driver in advance of the possibility that the vehicle approaches the object, or assist a driving operation so as to prevent the vehicle from getting close to the object.

In the object recognition system according to the first aspect of the invention, the enlarging means may increase the amount of enlargement of the object as the vehicle speed is higher. The yaw rate required to circumvent or avoid an object increases as the vehicle speed is higher. If the amount of enlargement of the object is increased as the vehicle speed is higher, the driver can be informed of the presence of the object at an earlier opportunity, or assistance of the driving operation for preventing the vehicle from getting close to the object can be started at an earlier opportunity. As a result, the yaw rate required to circumvent the object can be kept small or reduced. Also, the driver is more likely to sense the relative distance between the vehicle and the object being shorter than it really is as the vehicle speed is higher. Therefore, as the vehicle speed is higher, the driver may recognize an object that is spaced by a larger distance from the course (or located farther from the course) as an obstacle. If the amount of enlargement of the object is increased as the vehicle speed is higher, the size of the object the driver may wish to avoid can be favorably enlarged.

If the amount of enlargement of the object is increased when the vehicle speed is low, the timing of notifying the driver of the presence of the object, or the timing of assisting the driver in the driving operation for circumventing the object may be too early to match the driver's sense. On the other hand, if the amount of enlargement of the object is reduced as the vehicle speed is lower, the above-mentioned notifying timing or the timing of assisting the driving operation can be prevented from largely deviating from the driver's sense. It is, however, to be noted that, even when the vehicle speed is high, the above-mentioned notifying timing or the timing of assisting the driving operation may be too early to match the driver's sense if the amount of enlargement is excessively large; therefore, the upper limit may be placed on the amount of enlargement of the object.

In the object recognition system according to the first aspect of the invention, the enlarging means may change the amount of enlargement of the object, using the degree of deterioration of the driver's consciousness as a parameter. Also, the enlarging means may change the amount of enlargement of the object, using the vehicle speed and the degree of deterioration of the driver's consciousness as two parameters. In this case, the enlarging means may determine the degree of deterioration of the driver's consciousness in connection with his/her driving operation, and may increase the amount of enlargement of the object as the determined degree of deterioration of consciousness is higher.

As the degree of deterioration of the driver's consciousness is higher, namely, as the driver's consciousness is lower, the driver's recognition of the object, or the driving operation performed by the driver for circumventing the object may be delayed. If the amount of enlargement of the object is set to a larger value as the degree of deterioration of the driver's consciousness is higher, the driver whose consciousness is deteriorated or lowered by a large degree can be notified of the presence of the object at an earlier opportunity, or the driving operation performed by the driver whose consciousness is lowered by a large degree can be assisted at an earlier opportunity.

In the object recognition system according to the first aspect of the invention, the enlarging means may change the amount of enlargement of the object, using the angle of inclination of the vehicle relative to the object as a parameter, in place of the vehicle speed. Also, the enlarging means may change the amount of enlargement of the object, using at least two parameters selected from the vehicle speed, the degree of deterioration of the driver's consciousness, and the angle of inclination. In this case, the enlarging means may increase the amount of enlargement of the object as the angle of inclination of the vehicle relative to the object is larger.

As the angle of inclination of the vehicle relative to the object is larger, the amount of operation (e.g., the steering amount per unit time or the brake operation amount per unit time) or yaw rate required to prevent the vehicle from colliding with or getting close to the object increases. If the amount of enlargement of the object is increased as the angle of inclination of the vehicle relative to the object is larger, the driver can be notified of the presence of the object at an earlier opportunity, or the assistance in the driving operation for circumventing the object can be started at an earlier opportunity. Consequently, the yaw rate required to prevent the vehicle from colliding with or getting close to the object can be kept small or reduced.

In the object recognition system according to the first aspect of the invention, the enlarging means may set the amount of enlargement of the object when the object is a moving body, to a larger value than that in the case where the object is a stationary body. When the object is a moving body, the relative distance between the object and the vehicle may be reduced in a short time, as compared with the case where the object is a stationary body. If the amount of enlargement of the object is set when the object is a moving body, to a larger value than that in the case where the object is a stationary body, the driver can be notified of the presence of the object before the relative distance between the object and the vehicle is reduced, or the assistance in the driving operation for circumventing the object is started at an earlier opportunity.

In the object recognition system according to the first aspect of the invention, the enlarging means may increase the amount of enlargement of the object as a distance between the object and a lane boundary is shorter. As the distance between the object and the lane boundary is shorter, an extra period from the time when the vehicle goes off or deviates from the lane to the time when the vehicle gets close to the object is shortened. If the amount of enlargement of the object is increased as the distance between the object and the lane boundary is shorter, an extra period from the time when the driver is notified of the presence of the object to the time when the vehicle gets close to the object can be prolonged, or the yaw rate required to prevent the vehicle from colliding with or getting close to the object can be kept small or reduced.

In the object recognition system according to the first aspect of the invention, the enlarging means may increase the amount of enlargement of the object as the reliability with which the object is detected by the detecting means is higher. When the reliability in object detection by the detecting means is low, the detected object may not exist in reality. Therefore, if the driver is notified of the presence of the object or the driving operation for preventing the vehicle from getting close to the object is assisted when the reliability in object detection is low, the driver may feel uncomfortable or odd, or may be annoyed. If, on the other hand, the amount of enlargement of the object is increased as the reliability with which the object is detected by the detecting means is higher, the above-described problem can be solved.

In the object recognition system according to the first aspect of the invention, the enlarging means may determine the amount of enlargement of the object, using at least two parameters selected from the above-mentioned plurality of parameters. Further, the enlarging means may change the amount of enlargement of the object, using a parameter correlated with the weather outside the vehicle and/or a parameter correlated with the brightness of the exterior of the vehicle, in addition to or in place of the above-indicated parameters. For example, the amount of enlargement of the object may be set when the amount of raindrops detected by a raindrop sensor is large, to be a larger value than that in the case where the amount of raindrops is small (and the case where no raindrop is detected). Also, the amount of enlargement of the object may be increased as the illuminance detected by an illuminance sensor is lower. When there is a large amount of raindrops, or the illuminance is low, it is more difficult for the driver to see and recognize the object, as compared with the case where the amount of raindrops is small, or the illuminance is high. Therefore, if the amount of enlargement of the object is increased as the amount of raindrops is larger, or as the illuminance is lower, it is possible to notify the driver of the presence of an object which the driver has a difficulty in seeing and recognizing, or to assist the driving operation for preventing the vehicle from getting close to the object.

With the object recognition system according to the first aspect of the invention, a relatively small object can be recognized more effectively.

An object recognition method of a vehicle according to a second aspect of the invention includes the steps of detecting an object that is present around the vehicle, enlarging the size of the detected object in a direction that is determined according to a basis other than the object, and recognizing the enlarged object.

By the object recognition method of the vehicle according to the second aspect of the invention, the same or similar effects provided by the object recognition system of the vehicle according to the first aspect of the invention can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings. In the following, a driving assist system that determines a running course of the vehicle and an obstacle, and performs a driving assist operation to prevent the vehicle from deviating from the determined course or colliding with the obstacle will be described. The "driving assist operation" mentioned herein is carried out at the time when the vehicle is able to avoid the obstacle, and is carried out at an earlier time than a collision damage alleviating operation performed when a collision between the vehicle and the obstacle cannot be avoided. It is to be understood that the configuration of the system which will be described below illustrates one embodiment of the invention, and the invention is not limited to the configuration as described below.

Figure 1:
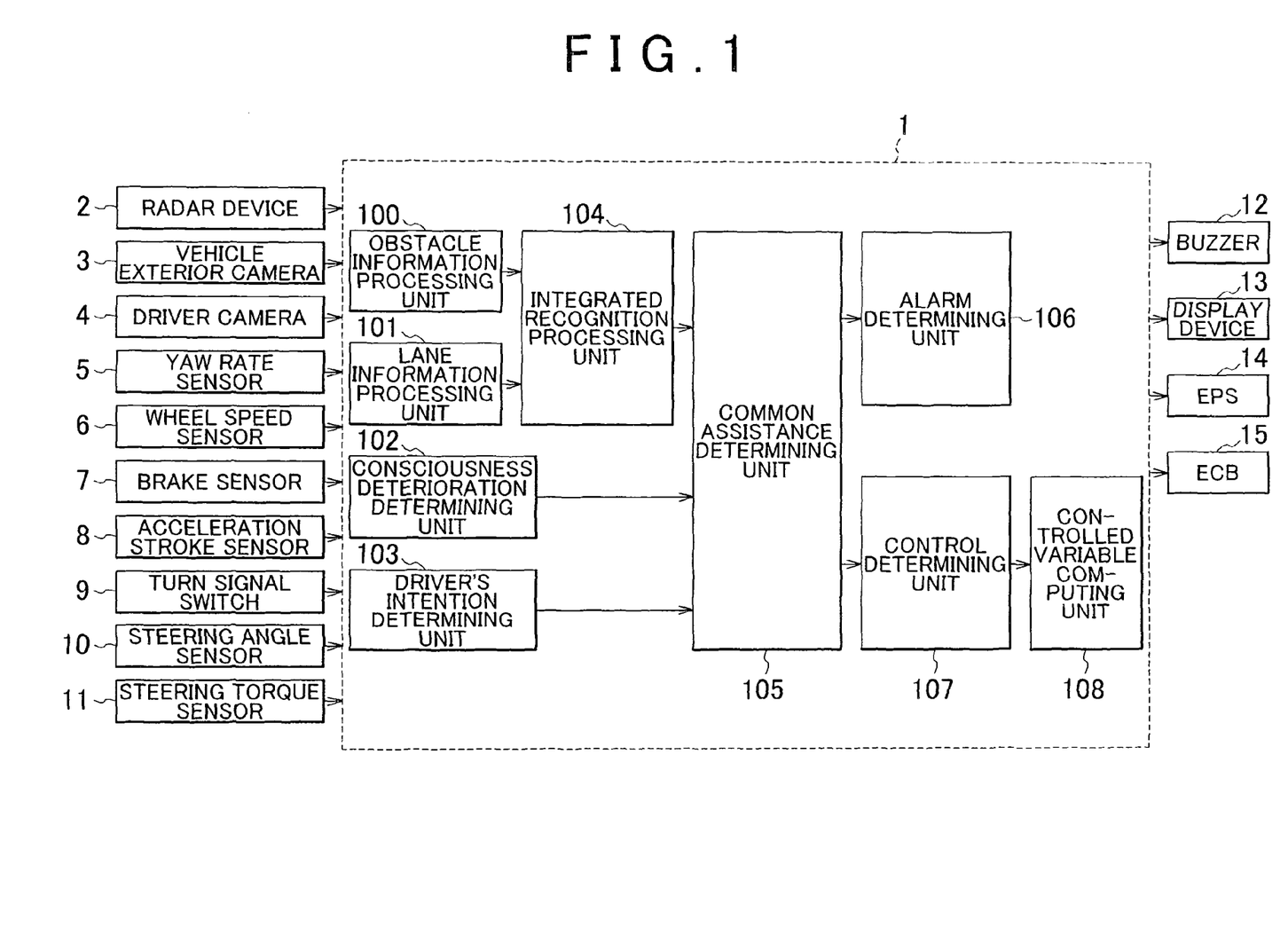
FIG. 1 is a block diagram illustrating the configuration (functional units) of a driving assist system of a vehicle to which one embodiment of the invention is applied.

FIG. 1 is a block diagram illustrating the configuration (functional units) of a vehicular driving assist system to which the invention is applied. As shown in FIG. 1, a control unit (ECU) 1 for driving assist is installed on the vehicle.

The ECU 1 is an electronic control unit including CPU, ROM, RAM, backup RAM, and an I/O interface. Various sensors, such as a radar device 2, vehicle exterior camera 3 for photographing the exterior or outside of the vehicle, driver camera 4 for photographing the driver, yaw rate sensor 5, wheel speed sensor 6, brake sensor 7, acceleration stroke sensor 8, turn signal switch 9, steering angle sensor 10, and a steering torque sensor 11, are electrically connected to the ECU 1, and the ECU 1 receives output signals of these sensors.

The radar device 2 is mounted on the front side of the vehicle, for example, and is operable to transmit millimeter waves to the front of the vehicle and receive radio waves (reflected waves) reflected by an object outside the vehicle, thereby to generate information (for example, a relative distance or a relative angle) concerning the position of the object relative to the vehicle. The vehicle exterior camera 3 is placed within the vehicle compartment at a position where the camera can capture the front of the vehicle in the field of view, for example, and generates an image of the front of the vehicle. The driver camera 4 is placed within the vehicle compartment at a position where the camera can capture the driver in the field of view, for example, and generates an image of the driver. The yaw rate sensor 5 is mounted on the vehicle body, for example, and generates an electric signal correlated with the yaw rate of the vehicle. The wheel speed sensor 6 is mounted on a wheel of the vehicle, and generates an electric signal correlated with the running speed of the vehicle.

For example, the brake sensor 7 is mounted on a brake pedal within the vehicle compartment, and generates an electric signal correlated with the operation torque (pedal pressure) applied to the brake pedal. The acceleration stroke sensor 8 is mounted on an accelerator pedal within the vehicle department, and generates an electric signal correlated with the operation torque (pedal pressure) applied to the accelerator pedal. The turn signal switch 9 is mounted on a turn signal lever within the vehicle compartment, and generates an electric signal correlated with a direction indicated by a direction indicator when the turn signal lever is operated. The steering angle sensor 10 is mounted on a steering rod connected to a steering wheel within the vehicle compartment, and generates an electric signal correlated with the angle of rotation of the steering wheel from the neutral position. The steering torque sensor 11 is mounted on the steering rod, and generates an electric signal correlated with torque (steering torque) applied to the steering wheel.

Also, various devices and systems, such as a buzzer 12, display device 13, electric power steering (EPS) system 14, and an electronically controlled brake (ECB) system 15, are connected to the ECU 1, and these devices and systems are electrically controlled by the ECU 1.

For example, the buzzer 12 is mounted in the vehicle compartment, and is operable to generate an alarm or warning tone. The displace device 13 is mounted in the vehicle compartment, and is operable to display various messages and/or warning lamps. The electric power steering (EPS) system 14 is operable to assist the driver in operating the steering wheel, using torque generated by an electric motor. The electronically controlled brake (ECB) system 15 is operable to electrically adjust the hydraulic pressure (brake pressure) of a friction brake provided on each wheel.

The ECU 1 has the functions as described below, so as to control various devices and systems, using the output signals of the above-indicated various sensors. Namely, the ECU 1 includes an obstacle information processing unit 100, a lane information processing unit 101, a consciousness deterioration determining unit 102, a driver's intention determining unit 103, an integrated recognition processing unit 104, a common assist determining unit 105, an alarm determining unit 106, a control determining unit 107, and a controlled variable computing unit 108.

The obstacle information processing unit 100 computes coordinates of the position of an object in a coordinate system in which the self vehicle lies on the origin, based on information on the object generated from the radar device 2. The obstacle information processing unit 100 creates obstacle information including the coordinates of the position of the object and the yaw angle of the self vehicle relative to the object. The obstacle information processing unit 100 may create obstacle information, based on an image or picture captured by the vehicle exterior camera 3.

The lane information processing unit 101 creates lane information including information concerning a lane and information concerning the orientation of the vehicle relative to the lane, based on an image or picture captured by the vehicle exterior camera 3. The information concerning the lane includes, for example, information concerning indicators indicative of lane boundaries (for example, road markers, such as white lines and yellow lines, indicative of lane boundaries, and three-dimensional objects, such as curbs, guardrails, gutters or ditches, walls, and poles, which extend alongside the lane), and information concerning the width of the lane. The information concerning the orientation of the vehicle relative to the lane includes, for example, information concerning distances between the indicators indicative of the lane boundaries and the vehicle, information concerning the offset amount of the vehicle position relative to the center of the lane, and information concerning the yaw angle of the vehicle travelling direction relative to the indicators indicative of the lane boundaries. When a navigation system is installed on the vehicle, the lane information processing unit 101 may create information concerning the lane, from map information and GPS information possessed by the navigation system.

The consciousness deterioration determining unit 102 determines the degree of deterioration of consciousness (wakefulness) of the driver, based on an image or picture captured by the driver camera 4. For example, the consciousness deterioration determining unit 102 computes the eye closure time or eye closure frequency of the driver, from an image or picture captured by the driver camera 4, and determines that the consciousness of the driver is deteriorated (the wakefulness is low) when the eye closure time or eye closure frequency exceeds the upper limit. Also, the consciousness deterioration determining unit 102 may compute a length of time for which the orientation of the driver's face or the direction of the line of sight deviates from the vehicle travelling direction, from an image or picture captured by the driver camera 4, and may determine that the driver is not looking at the road when the calculated time exceeds the upper limit.

The driver's intention determining unit 103 determines whether changes in the operation amount of the brake pedal, changes in the operation amount of the accelerator pedal, or changes in the operation amount (steering amount) of the steering wheel occur due to the intention of the driver, based on the output signals of the wheel speed sensor 6, brake sensor 7, acceleration stroke sensor 8, turn signal switch 9, steering angle sensor 10, and the steering torque sensor 11.

The integrated recognition processing unit 104 specifies a region (running course) on which the vehicle is able to run, based on the obstacle information created by the obstacle information processing unit 100 and the lane information created by the lane information processing unit 101, and determines the yaw angle of the vehicle relative to a course boundary, and the offset amount of the vehicle relative to the center of the course. The integrated recognition processing unit 104 enlarges the size of the object specified by the obstacle information, and specifies the course based on information concerning the size and position of the object that has been enlarged, and the lane information, or determines whether the object thus enlarged can be an obstacle of the vehicle. A method of enlarging the size of the object specified by the obstacle information will be described later.

In the meantime, on a road having a small lane width, the driver may have no other choice but to let the vehicle deviate from the lane. In view of this situation, the integrated recognition processing unit 104 may set a running course, on a road having a small lane width, based on information concerning road markers (such as white lines and yellow lines) indicative of the lane boundaries, or three-dimensional objects (such as curbs, guardrails, gutters, walls, and poles) that extend alongside the lane. For example, when road markers are present on both sides of the lane, the integrated recognition processing unit 104 may set a running course that is wider than the original lane, with reference to the center of the lane (intermediate between the road markers present on both sides of the lane). Also, when a road marker or markers is/are present on only one side of the lane, the integrated recognition processing unit 104 may set a reference position outside the road marker(s), and set a range of a given width from the reference position, as a running course. However, if an object exists in the course thus enlarged, it is desirable to place limitations on enlarging setting of the running course.

The common assist determining unit 105 determines whether execution of a driving assist operation is to be restricted, based on the information created by the integrated recognition processing unit 104, the result of determination made by the consciousness deterioration determining unit 102, and the result of determination made by the driver's intention determining unit 103. For example, if the consciousness deterioration determining unit 102 determines that the consciousness of the driver is deteriorated or lowered (the degree of deterioration of consciousness is high, or the wakefulness is low), or determines that the driver is not looking at the road, the common assist determining unit 105 permits the driving assist operation to be performed. Also, if the driver's intention determining unit 103 determines that the driver performs an intentional operation, the common assist determining unit 105 restricts execution of the driving assist operation.

When the common assist determining unit 105 permits the driving assist operation to be performed, the alarm determining unit 106 determines the timing of sounding of the buzzer 12 or the timing of display of a warning message or warning lamp on the display device 13. For example, when the distance between the vehicle and a course boundary (one of the boundaries of the course) as measured in the vehicle width direction becomes equal to or smaller than a predetermined distance, the alarm determining unit 106 causes the buzzer 12 to sound an alert, or causes the display device 13 to display a warning message or warning lamp thereon.

Also, the alarm determining unit 106 may cause the buzzer 12 to sound an alert, or cause the display device 13 to display a warning message or warning lamp, when the time it takes the vehicle to reach a course boundary becomes equal to or shorter than a predetermined time. In the case where the course has a small width, the alarm determining unit 106 may cause the buzzer 12 to sound an alert, or cause the display device 13 to display a warning message or warning lamp, when the distance between the vehicle and a three-dimensional object (such as a curb, guardrail, gutter, wall, or a pole that is present alongside the course) as measured in the vehicle width direction becomes equal to or smaller than a predetermined distance. In the case where the vehicle enters a curve, or is running along a curve, the alarm determining unit 106 may cause the buzzer 12 to sound an alert, or cause the display device 13 to display a warning message or warning lamp, when the distance between the vehicle and a course boundary as measured in the vehicle travelling direction becomes equal to or smaller than a predetermined distance. Also, in the case where the vehicle enters a curve, or is running along a curve, the alarm determining unit 106 may cause the buzzer 12 to sound an alert, or cause the display device 13 to display a warning message or warning lamp, when the time it takes the vehicle to reach a course boundary becomes equal to or shorter than a predetermined time.

In this connection, the above-mentioned predetermined distance or predetermined time is changed in accordance with the output signal (vehicle speed) of the wheel speed sensor 6 and/or the output signal (yaw rate) of the yaw rate sensor 5. For example, as the vehicle speed is higher, the predetermined distance is set to a longer distance, or the predetermined time is set to a longer time. Also, as the yaw rate is larger, the predetermined distance is set to a longer distance, and the predetermined time is set to a longer time.

The manner of giving a warning to the driver is not limited to sounding of the buzzer 12 and display of a warning message or warning lamp on the display device 13, but another method, such as intermittently changing the torque for fastening the seat belt, may be employed.

When the common assist determining unit 105 permits the driving assist operation to be performed, the control determining unit 107 determines the time at which the electric power steering (EPS) system 14 or electronically controlled brake (ECB) system 15 is actuated so as to prevent the vehicle from deviating from the course or colliding with an obstacle. For example, the control determining unit 107 may actuate the electric power steering (EPS) system 14 or electronically controlled brake (ECB) system 15 when the distance between the vehicle and a course boundary or an obstacle as measured in the vehicle width direction becomes equal to or shorter than a predetermined distance.

Also, the control determining unit 107 may actuate the electric power steering (EPS) system 14 or electronically controlled brake (ECB) system 15, when the time it takes the vehicle to reach the course boundary or obstacle becomes equal to or shorter than a predetermined time. When the course has a small width, the control determining unit 107 may actuate the electric power steering (EPS) system 14 or electronically controlled brake (ECB) system 15 when the distance between the vehicle and a three-dimensional object (such as a curb, guardrail, gutter, wall, or pole, which exists alongside the course) as measured in the vehicle width direction becomes equal to or smaller than a predetermined distance.

In the case where the vehicle enters a curve or the vehicle is running along a curve, the control determining unit 107 may actuate the electric power steering (EPS) system 14 or electronically controlled brake (ECB) system 15 when the distance between the vehicle and a course boundary as measured in the vehicle travelling direction becomes equal to or shorter than a predetermined distance. In the case where the vehicle enters a curve or the vehicle is running along a curve, the control determining unit 107 may actuate the electric power steering (EPS) system 14 or electronically controlled brake (ECB) system 15 when the time it takes the vehicle to reach the course boundary becomes equal to or shorter than a predetermined time.

While the predetermined distance or predetermined time used by the control determining unit 107 may be changed according to the vehicle speed or yaw rate, like the predetermined distance or predetermined time used by the alarm determining unit 106, the predetermined distance or time used by the control determining unit 107 is set to be shorter than the predetermined distance or time used by the alarm determining unit 106.

When a request to actuate the electric power steering (EPS) system 14 or electronically controlled brake (ECB) system 15 is generated from the control determining unit 107, the controlled variable computing unit 108 computes a controlled variable of the electric power steering (EPS) system 14 or electronically controlled brake (ECB) system 15, and actuates the electric power steering (EPS) system 14 or electronically controlled brake (ECB) system 15 according to the calculated controlled variable and the timing determined by the control determining unit 107. For example, the controlled variable computing unit 108 computes a target yaw rate required to prevent the vehicle from deviating from the course, or a target yaw rate required to circumvent or avoid an obstacle, using the information created by the integrated recognition processing unit 104, the output signal (vehicle speed) of the wheel speed sensor 6, and the output signal (yaw rate) of the yaw rate sensor 5, as parameters. More specifically, the controlled variable computing unit 108 computes a target yaw rate Ytrg according to the following equation, where D denotes the relative distance between a course boundary or obstacle and the vehicle, T denotes a length of time it takes the vehicle to reach the course boundary or obstacle, and θ denotes the yaw angle of the vehicle relative to the course boundary or obstacle.

$$Ytrg=(\theta \cdot V \cdot \sin \theta)/D$$

The controlled variable computing unit 108 determines the controlled variable (steering torque) of the electric power steering (EPS) system 14 and/or the controlled variable (brake oil pressure) of the electronically controlled brake (ECB) system 15, using the target yaw rate Ytrg as a parameter. At this time, the relationship between the target yaw rate Ytrg and the steering torque, and the relationship between the target yaw rate Ytrg and the brake oil pressure may be defined in the form of maps in advance. When the target yaw rate Ytrg is smaller than a predetermined value (the maximum value of the yaw rate with which deviation from the course and contact or collision with the obstacle can be avoided only by a steering action), the brake oil pressure of the electronically controlled brake (ECB) system 15 may be set to zero. If different brake oil pressures are applied to the friction brakes of the right and left wheels of the vehicle when the electronically controlled brake (ECB) system 15 is operated, a yaw rate that interferes with the yaw rate produced by the electric power steering (EPS) system 14 may be produced. Therefore, it is desirable to apply substantially the same brake oil pressure to the friction brakes of the right and left wheels.

The method of reducing the running speed of the vehicle is not limited to actuating the friction brakes by means of the electronically controlled brake (ECB) system 15, but the running speed of the vehicle may be reduced by converting the kinetic energy of the vehicle into electric energy (regeneration), or changing the speed ratio of the transmission so as to increase an engine brake.

The driving assist system as described above makes it possible to inform the driver of the presence of an obstacle or deviation of the vehicle from the course, and assist the driver in an operation to prevent the vehicle from deviating from the course or an operation to circumvent or avoid the obstacle.

Next, a method of virtually enlarging the size of an object specified by the obstacle information will be described. When the integrated recognition processing unit 104 receives obstacle information concerning a certain object from the obstacle information processing unit 100, the processing unit 104 enlarges the size of the object in a direction parallel to an indicator(s) indicative of a lane boundary (for example, a road marker, such as a white line or a yellow line, or three-dimensional objects, such as a curb, guardrail, gutter, wall, or pole, which continuously extend on the side of the road, or located at intervals on the side of the road). Namely, the integrated recognition processing unit 104 enlarges the size of the object in a direction parallel to the indicator(s) indicative of the lane boundary.

If the size of the object is enlarged in the above manner, the integrated recognition processing unit 104 specifies the course along which the vehicle will run, or determines whether the object thus enlarged can be an obstacle to the self vehicle, based on the position and size of the enlarged object.

For example, the integrated recognition processing unit 104 determines whether the enlarged object lies on the course of the self vehicle (i.e., a path along which the self vehicle is expected to run in the future). If the enlarged object does not lie on the course of the self vehicle, the integrated recognition processing unit 104 determines that the object is not an obstacle to the self vehicle. If the enlarged object lies on the course of the self vehicle, the integrated recognition processing unit 104 determines that the object is an obstacle to the self vehicle. By this method of recognizing an obstacle, it is possible to recognize an object located slightly off the course of the self vehicle, in other words, an object the self-vehicle may pass by or run right past, as an obstacle.

Figure 2A:
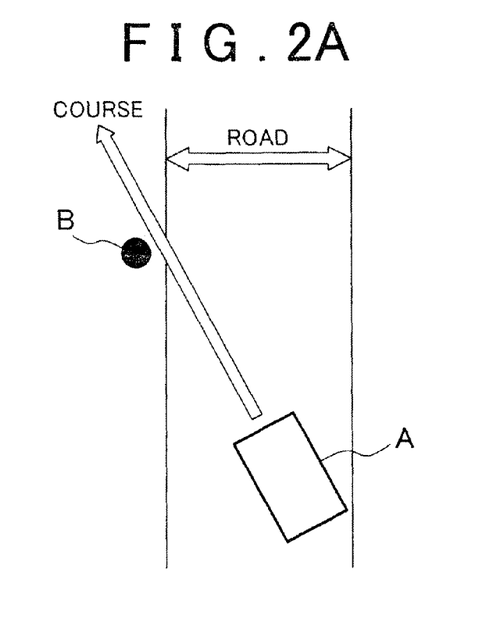
FIG. 2A and FIG. 2B are views concerned with the embodiment of the invention, each showing the relative positions of the course of a self vehicle and an object.
Figure 2B:
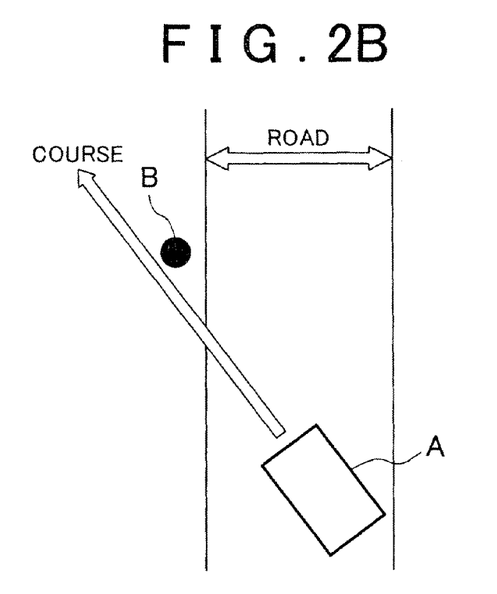
Figure 3A:
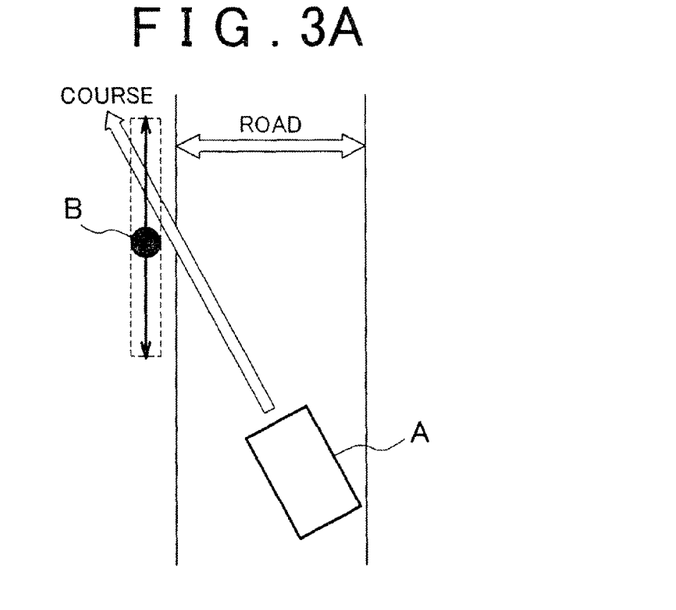
FIG. 3A and FIG. 3B are views concerned with the embodiment of the invention, each showing a method of enlarging the size of the object.
Figure 3B:
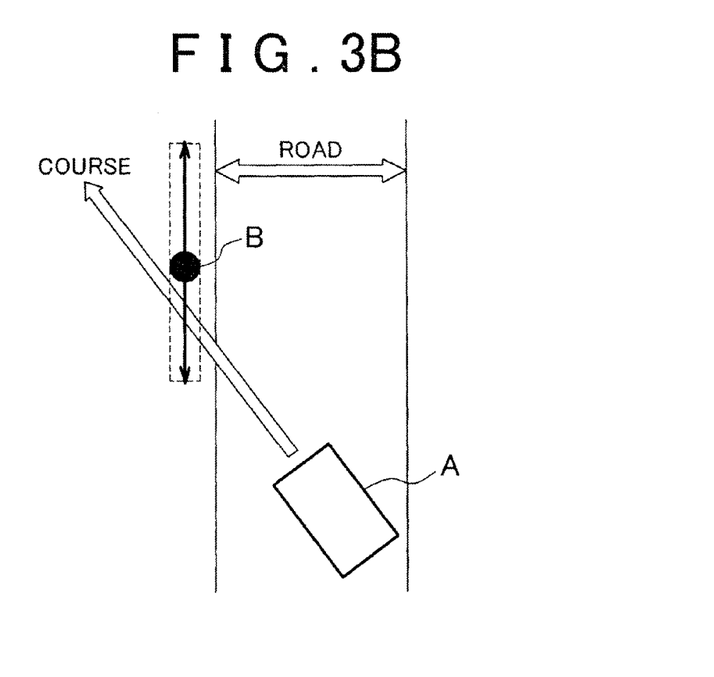

The self vehicle may pass by an object or pass through the vicinity of the object, in a manner as shown in FIG. 2A in which the self vehicle A passes by the object B on the far side thereof, or in a manner as shown in FIG. 2B in which the self vehicle A passes by the object B on the near side thereof. Therefore, it is desirable to enlarge the size of the object in both directions toward and away from the self vehicle A, from the object B as a starting point, as shown in FIG. 3A and FIG. 3B.

Figure 4:
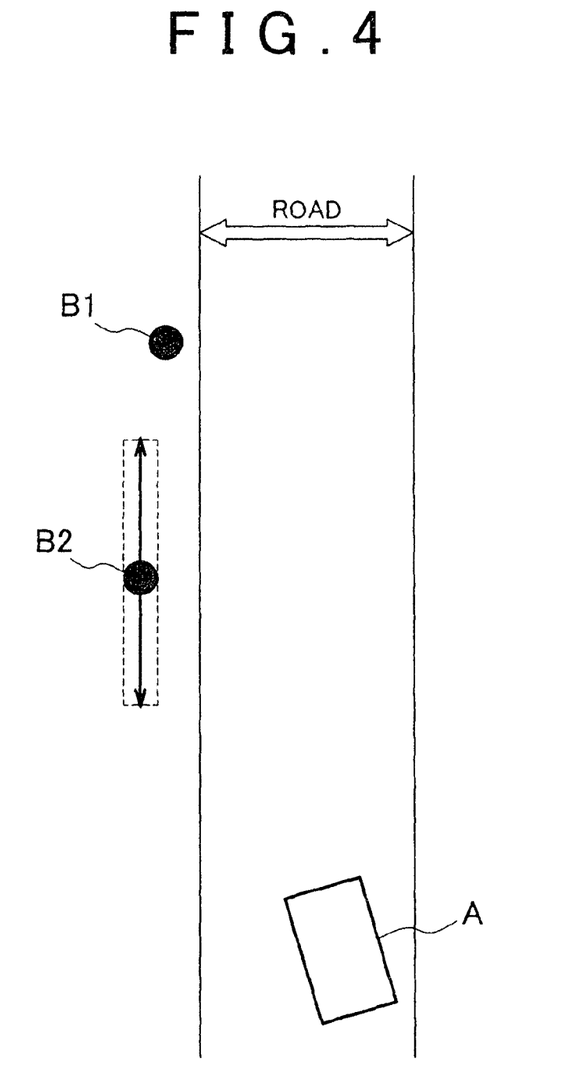
FIG. 4 is a view concerned with the embodiment of the invention, showing an image of setting an auxiliary line when there are two or more objects.

When the integrated recognition processing unit 104 receives obstacle information concerning two or more objects from the obstacle information processing unit 100, the size of one of the objects having the shortest distance relative to the self vehicle is enlarged. For example, when there are two objects B1, B2, as shown in FIG. 4, the integrated recognition processing unit 104 enlarges the size of the object B2 having the shorter distance relative to the self vehicle A.

By the above-described method of determining an obstacle, an object located slightly off the course of the self vehicle will be treated as an obstacle. Namely, objects the self vehicle may pass by, as well as objects that may collide with the self vehicle, will be treated as obstacles to be circumvented or avoided.

For example, when an object lies at a position slightly off the course of the self vehicle, a warning that informs the driver of the presence of the object or assistance in the driving operation for circumventing the object will not be provided unless the object is recognized as an obstacle. As a result, the self vehicle passes right past the object, and the passenger of the self vehicle may feel uncomfortable or may be scared.

On the other hand, if the size of the object B is enlarged in the direction parallel to the indicator(s) indicative of the lane boundary, as shown in FIG. 3A and FIG. 3B, the position of the object B thus enlarged interferes (intersects) with the course of the self vehicle A. In this case, the integrated recognition processing unit 104 recognizes the object B as an obstacle to the self vehicle; therefore, a warning that informs the driver of the presence of the object B or assistance in the driving operation for circumventing the object B is provided.

Figure 5A:
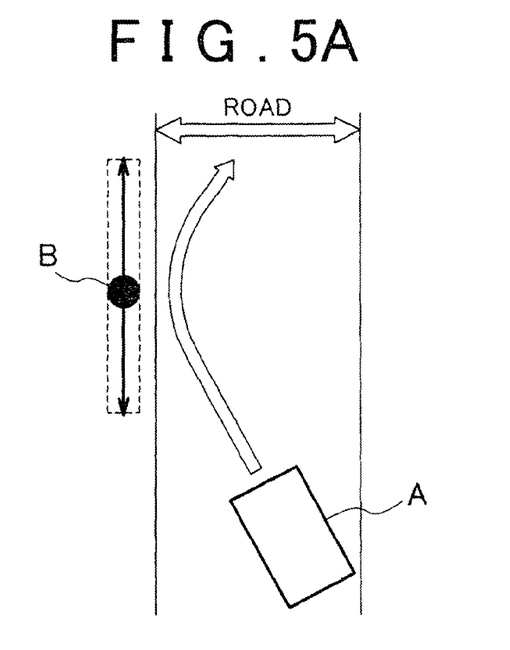
FIG. 5A and FIG. 5B are views concerned with the embodiment of the invention, each showing a track or course of the self vehicle relative to the object that has been enlarged.
Figure 5B:
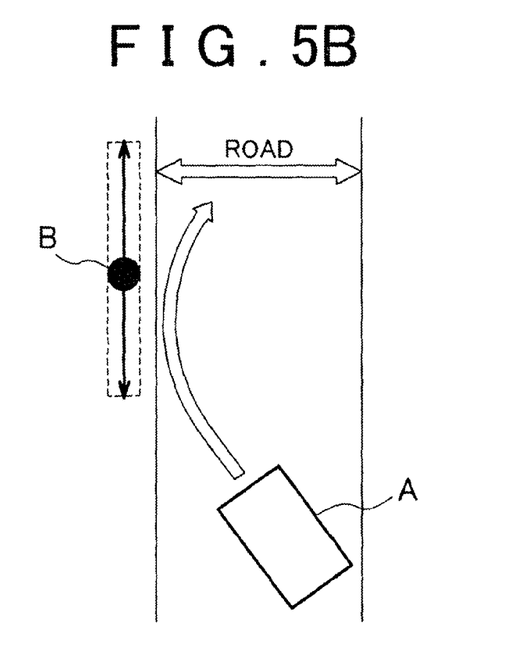

As a result, it is possible to cause the self vehicle A to run along a path or track that circumvents the object B, as shown in FIG. 5A and FIG. 5B.

While the amount of enlargement of the object (i.e., the amount of increase in the size of the object) may be a fixed amount that is determined in advance by adaptive processing using experiments, or the like, the amount of enlargement may be a variable amount that is changed using the output signal (vehicle speed) of the wheel speed sensor 6 as a parameter.

Figure 6:
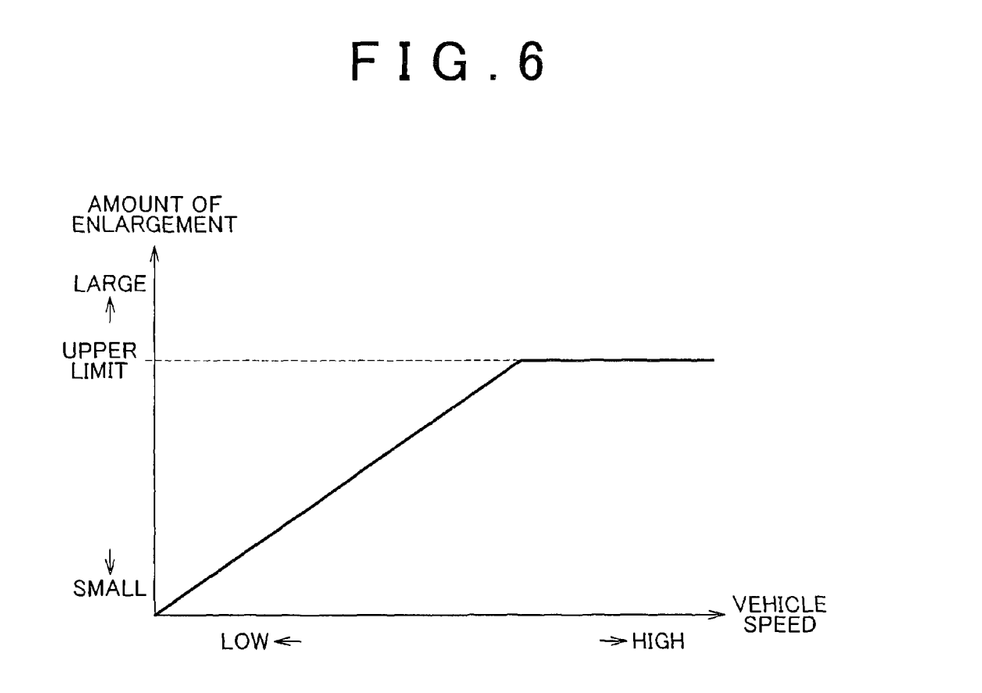
FIG. 6 is a view concerned with the embodiment of the invention, showing the relationship between the vehicle speed and the amount of enlargement of the object.

For example, the amount of enlargement of the object may be set to be larger as the vehicle speed is higher. The yaw rate required to circumvent an obstacle increases as the vehicle speed is higher. Also, as the vehicle speed is higher, the driver is more likely to sense the relative distance between the vehicle and the object being shorter than it really is. For example, even if the driver feels that an object is located sufficiently apart from the course of the vehicle when the vehicle speed is low, the driver may feel that the distance between the course and the object is short (i.e., the object is located close to the course) as the vehicle speed becomes higher. If the amount of enlargement of the object is increased as the vehicle speed is higher, the timing of warning the driver of the presence of the obstacle, or the timing of assisting the driver in the driving operation for circumventing the obstacle becomes earlier as the vehicle speed is higher. As a result, the yaw rate required to circumvent the obstacle can be reduced. Also, if the amount of enlargement is increased when the vehicle speed is low, the timing of warning the driver of the presence of the obstacle, or the timing of assisting the driver in the driving operation for circumventing the obstacle may be too early to match the driver's sense. On the other hand, if the amount of enlargement of the object is reduced as the vehicle speed is lower, the above-mentioned timing can be prevented from largely deviating from the driver's sense. Furthermore, an object located apart from the course of the vehicle is also recognized as an obstacle when the vehicle speed is high; therefore, a driving assist operation suitable for the driver's sense of distance can be performed. It is, however, to be noted that, even when the vehicle speed is high, the above-mentioned timing may be too early to match the driver's sense if the amount of enlargement is excessively large. Therefore, the upper limit of the amount of enlargement may be provided, as shown in FIG. 6.

Figure 7:
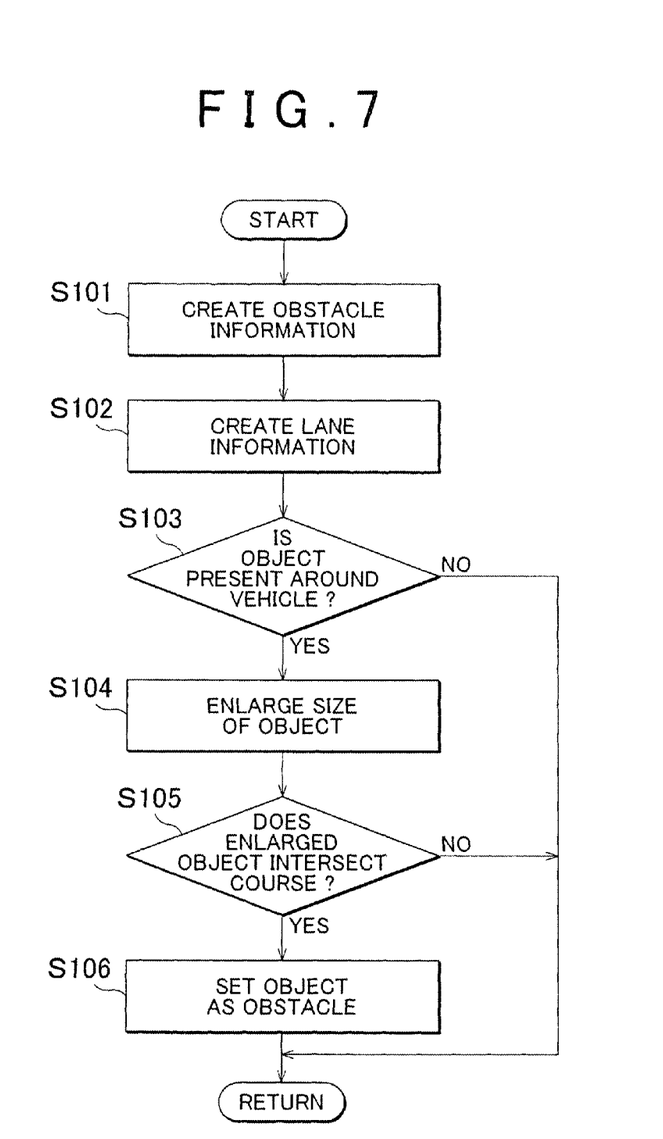
FIG. 7 is a flowchart concerned with the embodiment of the invention, illustrating a routine executed when an obstacle to the self vehicle is determined.

In the following, a procedure of determining whether an object specified by obstacle information can be an obstacle to the self vehicle will be described with reference to FIG. 7. FIG. 7 illustrates a control routine that is periodically executed by the ECU 1, and is stored in advance in ROM, or the like, of the ECU 1.

In the routine of FIG. 7, the ECU 1 initially creates obstacle information based on the output signal of the radar device 2 in step S101. Namely, the ECU 1 functions as the above-mentioned obstacle information processing unit 100. Thus, execution of step S101 by the ECU 1 provides the detecting means according to the invention.

In step S102, the ECU 1 creates lane information base on the output signal of the vehicle exterior camera 3. Namely, the ECU 1 functions as the above-mentioned lane information processing unit 101.

In step S103, the ECU 1 determines whether an object is present in the vicinity of the self vehicle, based on the obstacle information created in step S101. If a negative decision (NO) is made is step S103, the ECU 9 once finishes execution of this routine. If an affirmative decision (YES) is made in step S103, the ECU 1 proceeds to step S104, and virtually enlarges the size of the object. More specifically, the ECU 1 specifies a direction in which an indicator indicative of a lane boundary extends, or a direction in which a plurality of elements as indicator indicative of a lane boundary are arranged at intervals, based on the lane information created in step S102, and enlarges the size of the object in the specified direction so that the enlarged object is recognized. At this time, the ECU 1 determines the amount of enlargement, using the vehicle speed as a parameter. For example, the ECU 1 may determine the amount of enlargement, using the map as shown in FIG. 6 as described above. Thus, execution of step S104 by the ECU 1 provides the enlarging means according to the invention.

In step S105, the ECU 1 determines whether the object enlarged in step S104 lies on the course of the self vehicle. If a negative decision (NO) is made in step S105, the ECU 1 once finishes execution of this routine. If, on the other hand, an affirmative decision (YES) is made in step S105, the ECU 1 proceeds to step S106, and sets the object that has been enlarged, as an obstacle.

With the routine of FIG. 7 executed by the ECU 1 as described above, an object that is located slightly off the course of the self vehicle, in other words, an object the self vehicle may pass by, can be set as an obstacle. As a result, it is possible to enable the driver to recognize, in advance, the possibility that the self vehicle passes by the object, or enable the driver to change the course of the vehicle before the vehicle gets close to the object.

While the enlarging operation is performed on all of the objects detected by the radar device 2 in the illustrated embodiment, the enlarging operation may be performed only on an object or objects located outside of the course of the self vehicle.

Figure 8:
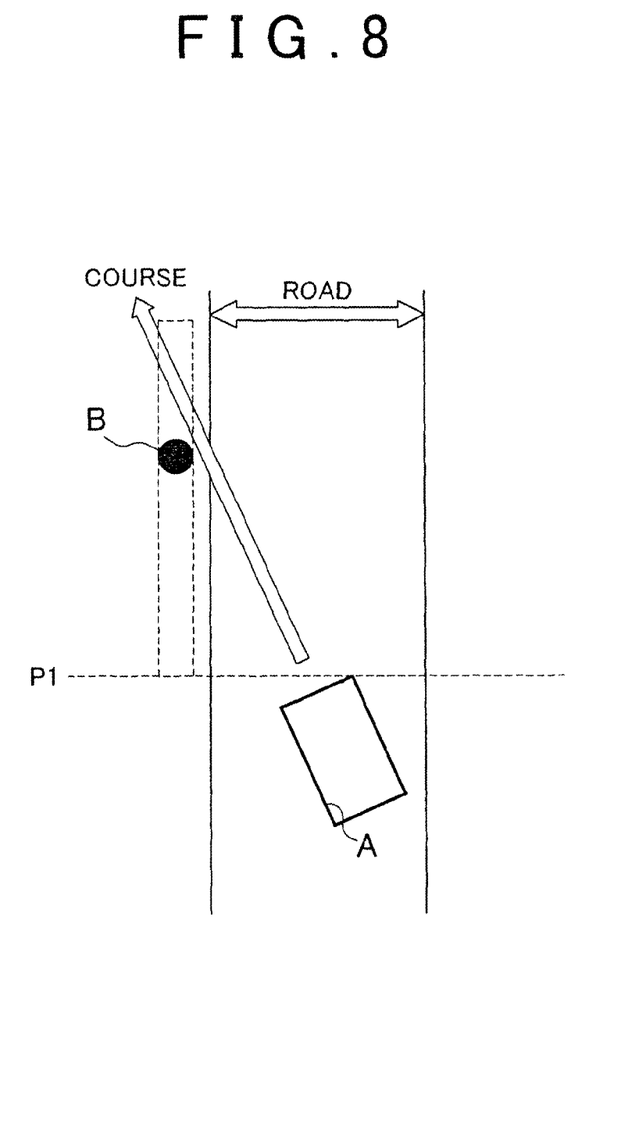
FIG. 8 is a view concerned with the embodiment of the invention, which images the timing of execution of a driving assist operation.

When the enlarged object is recognized as an obstacle, the timing of execution of the driving assist operation may be set to the time when the position of the self vehicle A as viewed in a direction parallel to the road (i.e., in a direction parallel to the indicators indicative of the lane boundaries) reaches the position (P1 in FIG. 8) of an end portion of the enlarged object B, as shown in FIG. 8. By utilizing the position of the enlarged object in this manner, it is possible to inform the driver of the presence of the object the self vehicle may pass by. Namely, it is possible to urge the driver to perform a driving operation for preventing the self vehicle from getting close to the object.

Figure 9A:
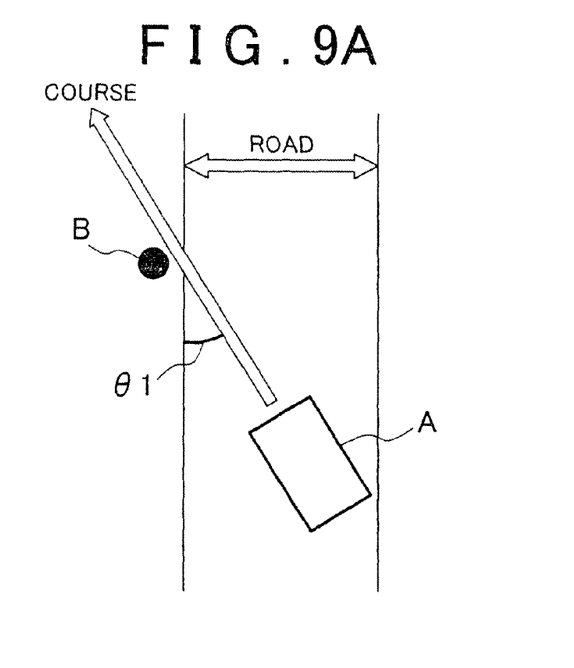
FIG. 9A and FIG. 9B are views concerned with the embodiment of the invention, showing another method of enlarging the size of the object.
Figure 9B:
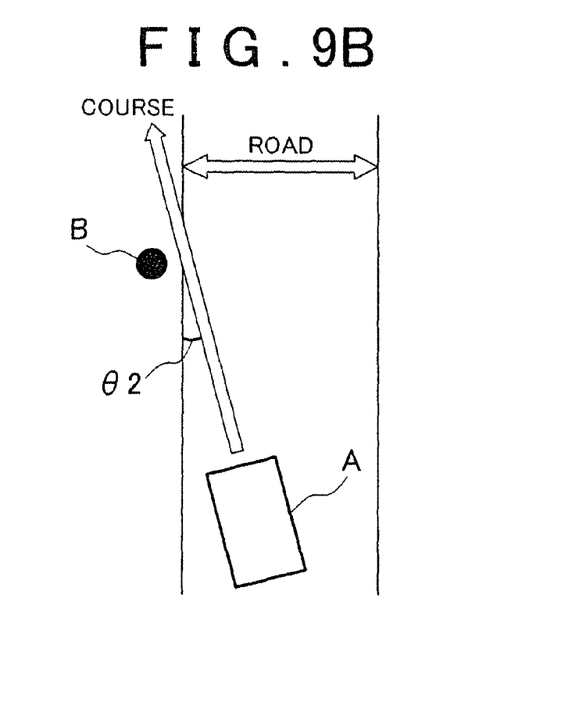
Figure 10:
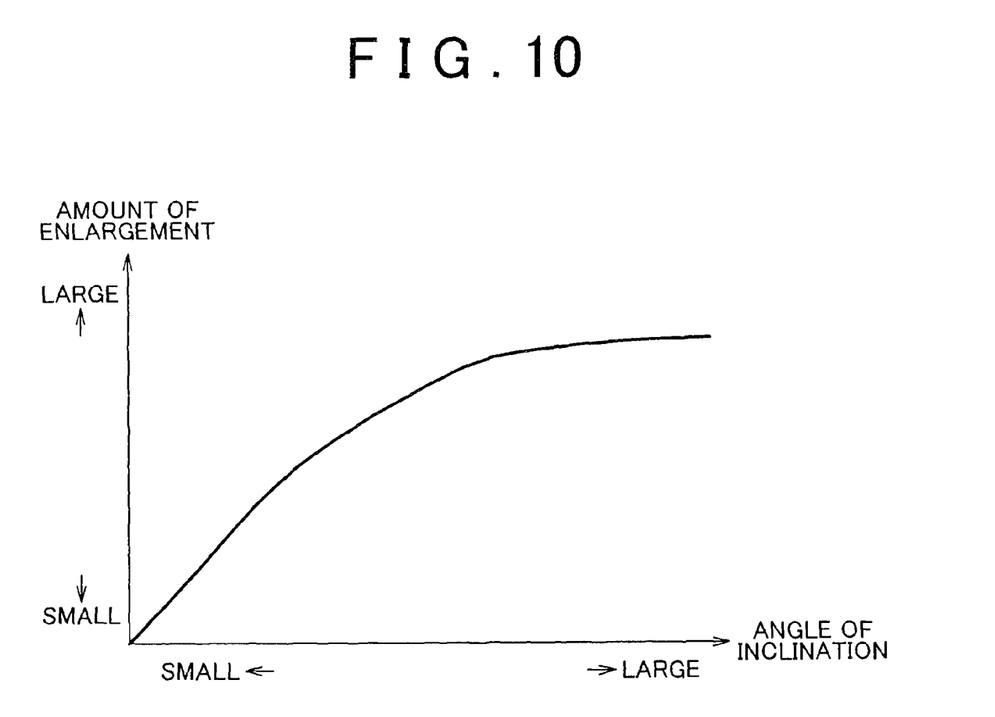
FIG. 10 is a view concerned with the embodiment of the invention, showing the relationship between the angle of inclination θ and the amount of enlargement of the object.

While the vehicle speed is taken as an example of parameter for determining the amount of enlargement of the object in the illustrated embodiment, the amount of enlargement may be determined using the angle of inclination of the travelling direction of the self vehicle relative to the direction parallel to the road (the indicators indicative of the lane boundaries), as a parameter. For example, when the angle of inclination $\theta 1$ is large as shown in FIG. 9A, the amount of operation (e.g., the steering amount per unit time or the brake operation amount per unit time) or yaw rate required to prevent the self vehicle from colliding with or getting close to the object is larger than that in the case where the angle of inclination $\theta 2$ (<$\theta 1$) is small. Accordingly, as shown in FIG. 10, the amount of enlargement of the object may be set to be larger as the angle of inclination $\theta$ is larger, as shown in FIG. 10.

Figure 11:
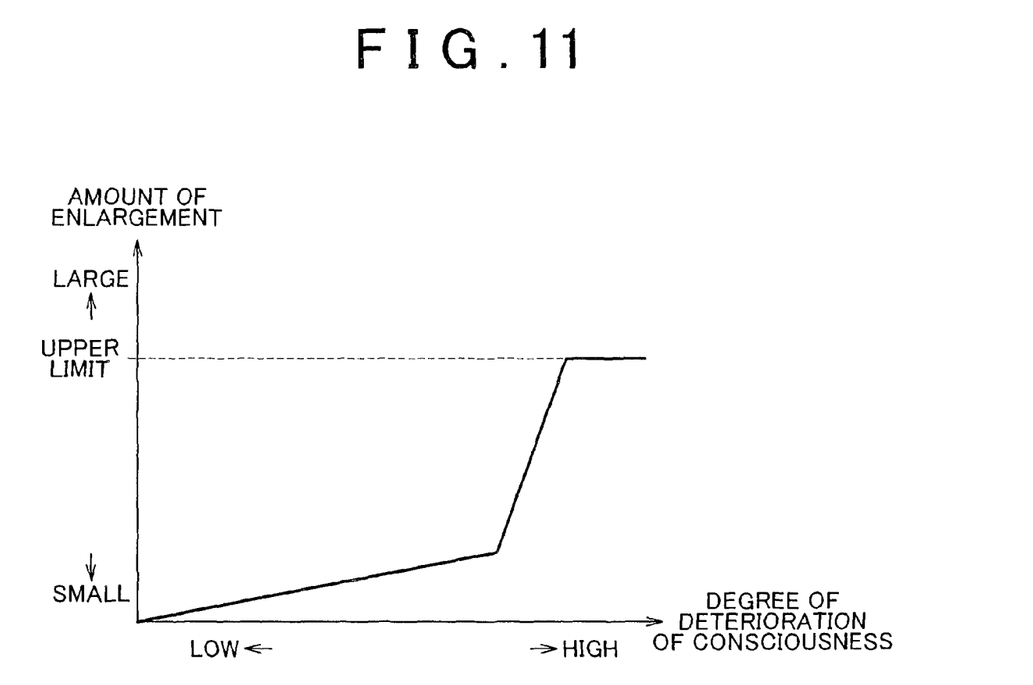
FIG. 11 is a view concerned with the embodiment of the invention, showing the relationship between the degree of deterioration of the driver's consciousness and the amount of enlargement of the object.

As another parameter for determining the amount of enlargement of the object, the result of determination made by the consciousness deterioration determining unit 102 (i.e., the degree of deterioration of the driver's consciousness) may be used. As the degree of deterioration of the driver's consciousness is higher, namely, as the driver's consciousness is lower, the driver's recognition of the object, or the driving operation performed by the driver for preventing the self vehicle from colliding with or getting close to the object, may be delayed. Accordingly, the amount of enlargement of the object may be set to be larger as the degree of deterioration of the driver's consciousness is higher. Also, when the degree of deterioration of the driver's consciousness is extremely low, there is a possibility that the self vehicle approaches the object according to the driver's intention; therefore, the amount of enlargement may be set to zero, as shown in FIG. 11.

Also, the amount of enlargement of the object may be set to a larger value when the object is a moving body, than that in the case where the object is a stationary body. When the object is a moving body, the relative distance between the object and the vehicle may be reduced in a short time, as compared with the case where the object is a stationary body. If the amount of enlargement of the object is increased when the object is a moving body, to be larger than that in the case where the object is a stationary body, the driving assist operation can be carried out before the relative distance between the object and the vehicle is reduced.

Also, the amount of enlargement of the object may be set to a larger value as the distance between the object and a lane boundary is shorter. As the distance between the object and the lane boundary is shorter, an extra period from the time when the vehicle goes off or deviates from the course to the time when the vehicle gets close to the object is shortened. If the amount of enlargement of the object is increased as the distance between the object and the lane boundary is shorter, it is possible to prevent the vehicle with improved reliability from colliding with or getting close to the object.

The amount of enlargement of the object may be increased as the reliability with which the radar device 2 detects an object is higher, or may be increased as the amount of raindrops detected by a raindrop sensor is larger, or may be increased as the illuminance (the intensity of illumination) of the exterior of the vehicle detected by an illuminance sensor is lower.

The invention claimed is:

1. An object recognition system of a vehicle, comprising:
a detecting unit that detects an object that is present around the vehicle; and
an enlarging unit that enlarges the size of the object detected by the detecting unit and recognizes the enlarged object, and determines a direction of enlargement of the object according to at least one indicator comprising at least one of a road marker indicative of a lane boundary and at least one three-dimensional object that extends on the side of a road or a plurality of three-dimensional objects located at intervals on the side of the road,
wherein,
the enlarging unit enlarges the size of the object in a direction parallel to the indicator.

2. The object recognition system according to claim 1, wherein,
the enlarging unit enlarges and recognizes the object so as to increase the parallelism between said at least one indicator and the direction of enlargement of the object detected by the detecting unit.

3. The object recognition system according to claim 1, wherein, when the detecting unit detects a plurality of objects, the enlarging unit enlarges the size of one of the objects which has the shortest distance relative to the vehicle, and recognizes the enlarged object.

4. The object recognition system according to claim 1, wherein the enlarging unit increases the amount of enlargement of the object as the vehicle speed is higher.

5. The object recognition system according to claim 1, wherein the enlarging unit determines a degree of deterioration of consciousness in connection with a driver's driving operation, and increases the amount of enlargement of the object as the determined degree of deterioration of consciousness is higher.

6. The object recognition system according to claim 1, wherein the enlarging unit increases the amount of enlargement of the object as an angle of inclination of the vehicle relative to the object is larger.

7. The object recognition system according to claim 1, wherein the enlarging unit sets the amount of enlargement of the object when the object is a moving body, to a larger value than that in the case where the object is a stationary body.

8. The object recognition system according to claim 1, wherein the enlarging unit increases the amount of enlargement of the object as a distance between the object and a lane boundary is shorter.

9. The object recognition system according to claim 1, wherein the enlarging unit increases the amount of enlargement of the object as a reliability with which the object is detected by the detecting means is higher.

10. The object recognition system according to claim 1, further comprising a raindrop sensor, wherein,
the enlarging unit sets the amount of enlargement of the object when the amount of raindrops detected by the raindrop sensor is large, to a larger value than that in the case where the amount of raindrops detected by the raindrop sensor is small or no raindrop is detected.

11. The object recognition system according to claim 1, further comprising an illuminance sensor, wherein,
the enlarging unit increases the amount of enlargement of the object as the illuminance detected by the illuminance sensor is lower.

12. The object recognition system according to claim 1, wherein the enlarging unit enlarges the object toward and away from the vehicle in a direction parallel to the indicator.

13. An object recognition method of a vehicle, comprising:
detecting an object that is present around the vehicle; and
enlarging the size of the detected object in a direction that is determined according to at least one indicator comprising at least one of a road marker indicative of a lane boundary and at least one three-dimensional object that extends on the side of a road or a plurality of three-dimensional objects located at intervals on the side of the road,
wherein,
the size of the object is enlarged in a direction parallel to the indicator.

14. An object recognition system of a vehicle, comprising:
detecting means for detecting an object that is present around the vehicle; and
enlarging means for enlarging the size of the object detected by the detecting means, recognizing the enlarged object, and determining a direction of enlargement of the object according to at least one indicator comprising at least one of a road marked indicative of a lane boundary and at least one three-dimensional object that extends on the side of a road or a plurality of three-dimensional objects located at intervals on the side of the road,
wherein,
the enlarging means enlarges the size of the object in a direction parallel to the indicator.

* * * * *